United States Patent [19]
Jo

[11] Patent Number: 6,072,357
[45] Date of Patent: Jun. 6, 2000

[54] VOLTAGE GENERATING APPARATUS WITH A VARIABLE PUMPING OPERATION

[75] Inventor: Gyu Seok Jo, Ichon, Rep. of Korea

[73] Assignee: Hyundai Electronics Industries Co., Ltd., Ichon, Rep. of Korea

[21] Appl. No.: 08/954,037

[22] Filed: Oct. 20, 1997

[30] Foreign Application Priority Data

Oct. 22, 1996 [KR] Rep. of Korea ...................... 96-47396

[51] Int. Cl.[7] ...................................................... G05F 1/10
[52] U.S. Cl. ........................... 327/536; 327/538; 327/540
[58] Field of Search ................................... 327/536, 538, 327/535, 540, 541, 543; 363/59, 60

[56] References Cited

U.S. PATENT DOCUMENTS

| | | | |
|---|---|---|---|
| 4,409,496 | 10/1983 | Baba | 307/296 R |
| 5,337,284 | 8/1994 | Cordoba et al. | 327/540 |
| 5,422,586 | 6/1995 | Tedbrow et al. | 327/306 |
| 5,499,183 | 3/1996 | Kobatake | 327/536 |
| 5,721,510 | 2/1998 | Miyajima | 327/536 |

*Primary Examiner*—Jung Ho Kim
*Attorney, Agent, or Firm*—Jacobson, Price, Holman & Stern, PLLC

[57] ABSTRACT

A voltage generating circuit for a semiconductor memory cell using a complementary MOS (CMOS) circuit uses an external clock signal on behalf of an internal oscillator clock signal as an input signal for driving an electric charge pumping portion, and performs a pumping operation which actively corresponds to the external input environment. The voltage generating apparatus includes: a frequency dividing circuit which reduces a frequency when the frequency of an external clock signal is too fast, and generates a reduced frequency; a frequency doubling portion which increases a frequency when the frequency of an external clock signal is too slow, and generates an increased frequency; a switch and delay portion which receives the external clock signal and an output signal of a level sensing portion, is controlled by the output signal of the level sensing portion, transmits the external clock signal to an electric charge pumping portion, cuts off or delays a transmission of external clock signal; an electric charge pumping portion which outputs a high voltage or a bulk bias voltage; and a reference electric potential sensing portion which senses an electric potential of the output terminal of the electric charge pumping portion, and thus controls the switch and delay means. As a result, the voltage generating apparatus reduces a chip area and a power-consumption, thereby facilitating a test of the voltage generating circuit.

2 Claims, 8 Drawing Sheets

VOLTAGE GENERATING APPARATUS WITH A VARIABLE PUMPING OPERATION

BACKGROUND OF THE INVENTION

1. Field of the Invention

The present invention relates to a voltage generating apparatus for a semiconductor memory element using a complementary metal-oxide semiconductor (hereinafter referred to as a CMOS) circuit. More particularly, it relates to a voltage generating apparatus for performing a stable operation by varying a pumping ability in response to a frequency variation in a circuit for generating a bulk bias voltage Vbb (namely, a substrate voltage) and a high-voltage Vpp.

2. Description of the Prior Art

In general, a high voltage Vpp is used as a transistor's gate voltage in a memory cell, a voltage for isolating a cell array block, and a n-channel MOS (hereinafter referred to as NMOS)-pull-up-transistor's gate voltage in a data output buffer. The bulk bias voltage Vbb is used as a NMOS bulk electrode.

FIG. 1 is a block diagram illustrating a conventional apparatus for generating a bulk bias voltage or high voltage.

The conventional apparatus for generating a bulk bias voltage or high voltage includes:

a ring oscillator for outputting a clock signal having a predetermined period to an electric charge pumping portion when a power-supply is applied to a chip;

an electric charge pumping portion which receives the clock signal from the ring oscillator as an input, and generates a bulk bias voltage Vbb or a high voltage Vpp; and a level sensing portion which senses an output voltage of the electric charge pumping portion, and determines whether the ring oscillator is operated or not.

The conventional apparatus is operated as follows.

First, when a power-supply is applied to the chip, the ring oscillator and the electric charge pumping portion are operated, thereby making a high voltage Vpp or a bulk bias voltage Vbb with a desirable level. The level sensing portion is then operated, the voltage Vpp or Vbb is pumped by a desirable level, and therefore the level sensing portion has a predetermined level.

In this case, if the high-voltage Vpp increases over the predetermined level of the level sensing portion or is lowered below the predetermined level of the level sensing portion, the level sensing portion stops an operation of the ring oscillator or drives the ring oscillator, thereby maintaining a constant high voltage.

On the contrary, if the bulk bias voltage Vbb increases over the predetermined level of the level sensing portion or is lowered below the predetermined level of the level sensing portion, the level sensing portion stops an operation of the ring oscillator or drives the ring oscillator, thereby maintaining a constant bulk bias voltage.

However, since the conventional apparatus for generating the bulk bias voltage or high voltage uses an internal oscillator clock signal having a constant period as an operation signal of the electric charge pumping portion, a pumping ability is not automatically corresponded to a speed of a column operation.

SUMMARY OF THE INVENTION

Accordingly, the present invention is directed to a voltage generating apparatus for a semiconductor memory element that substantially obviates one or more of the problems due to limitations and disadvantages of the related art.

An objective of the present invention is to provide a voltage generating apparatus for a semiconductor memory element which uses an external clock signal on behalf of an additional oscillator for an electric charge pump, and determines an operation ability of the pump by means of a frequency of the external clock signal, and thus makes a pumping ability automatically correspond to a speed of a column operation.

To achieve the above objective and in accordance with the purpose of the present invention, as embodied and broadly described, a voltage generating apparatus includes:

a frequency dividing circuit which reduces a frequency when the frequency of an external clock signal is too fast, and outputs the reduced frequency to an input terminal of a switch and delay portion;

a frequency doubling portion which increases a frequency when a frequency of an external clock signal is too slow, and outputs the increased frequency to an input terminal of a switch and delay portion;

a switch and delay portion which receives the external clock signal and an output signal of a level sensing portion, is controlled by the output signal of the level sensing portion, transmits the external clock signal to an electric charge pumping portion, cuts off or delays a transmission of the external clock signal;

an electric charge pumping portion which is operated by an output signal of the switch and delay portion, and generates a high voltage or a bulk bias voltage; and a reference electric potential sensing portion which is connected between an output terminal of the electric charge pumping portion and an input terminal of the switch and delay portion, and controls the switch and delay means by sensing an electric potential of the output terminal of the electric charge pumping portion.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the drawings:

DETAILED DESCRIPTION OF THE PREFERRED EMBODIMENTS

Reference will now be made in detail to the preferred embodiments of the present invention, examples of which are illustrated in the accompanying drawings.

Figure 1:
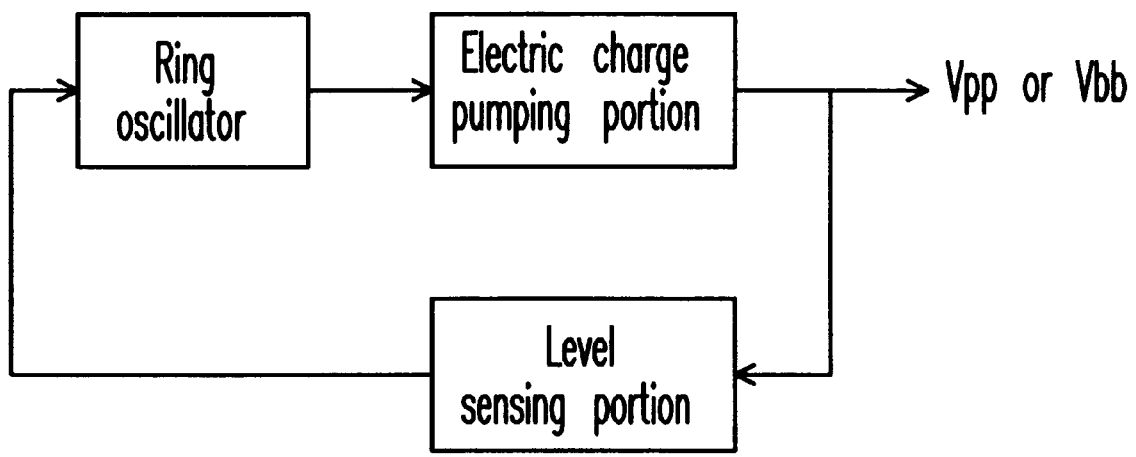
FIG. 1 is a block diagram illustrating a conventional apparatus for generating a high voltage or a bulk bias voltage.
Figure 2:
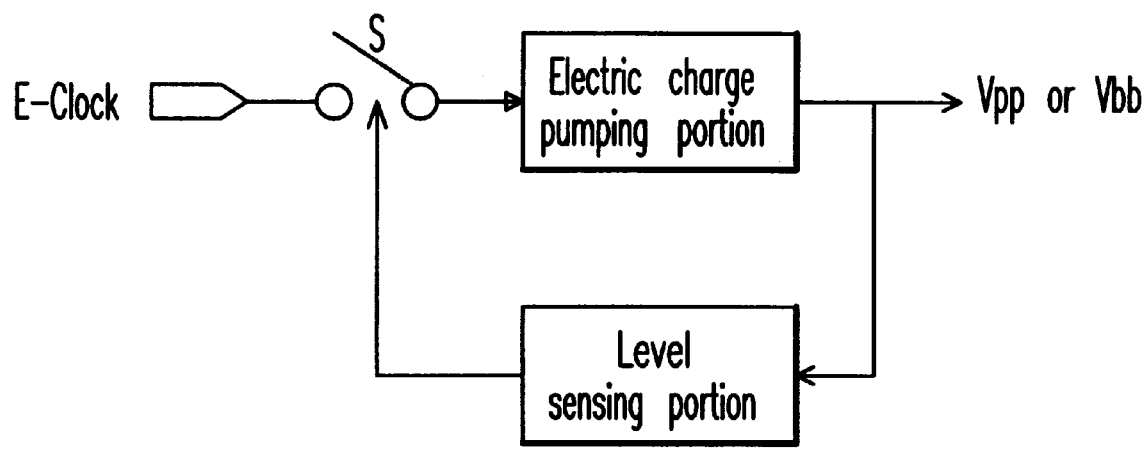
FIG. 2 is a block diagram illustrating a circuit for generating a high voltage or a bulk bias voltage in accordance with a preferred embodiment of the present invention.

FIG. 2 is a block diagram illustrating a circuit for generating a high voltage vpp or a bulk bias voltage Vbb in accordance with a preferred embodiment of the present invention.

As shown in FIG. 2, the circuit for generating the high voltage Vpp or the bulk bias voltage Vbb includes:

- a switch and delay circuit which receives an external clock signal E-Clock and an output signal of a level sensing portion, and generates a signal for driving an electric charge pumping portion;
- an electric charge pumping portion which receives an output signal of the switch and delay circuit as an input, and generates a high voltage Vpp or a bulk bias voltage Vbb; and
- a level sensing portion which senses an output signal of the electric charge pumping portion, and controls the switch and delay circuit and the electric charge pumping portion.

The operations of the above circuit will now be described below.

A case of generating the high voltage Vpp will be first described in the following.

When a power-supply is initially applied to a chip, the electric charge pumping portion is operated, thereby making a high voltage Vpp having a desirable level. The level sensing portion is then operated, and pumps the high voltage Vpp by the desirable level. If the high voltage Vpp continuously increases over a reference electric potential of the level sensing portion, a reference electric potential sensing portion is operated, cuts off a transmission of the external clock signal E-Clock into the electric charge pumping portion by controlling the switch and delay circuit, and makes the electric charge pumping portion not pump the electric charge. On the contrary, if the high voltage Vpp is lower than the reference electric potential of the reference electric potential sensing portion while operating a memory element, the level sensing portion inputs the external clock signal E-Clock into the electric charge pumping portion by controlling the switch and delay circuit, thereby achieving an electric charge's pumping again.

Hereinafter, the present invention will be more specifically described with reference to a circuit for generating the above high voltage Vpp or a bulk bias voltage Vbb.

Figure 3:
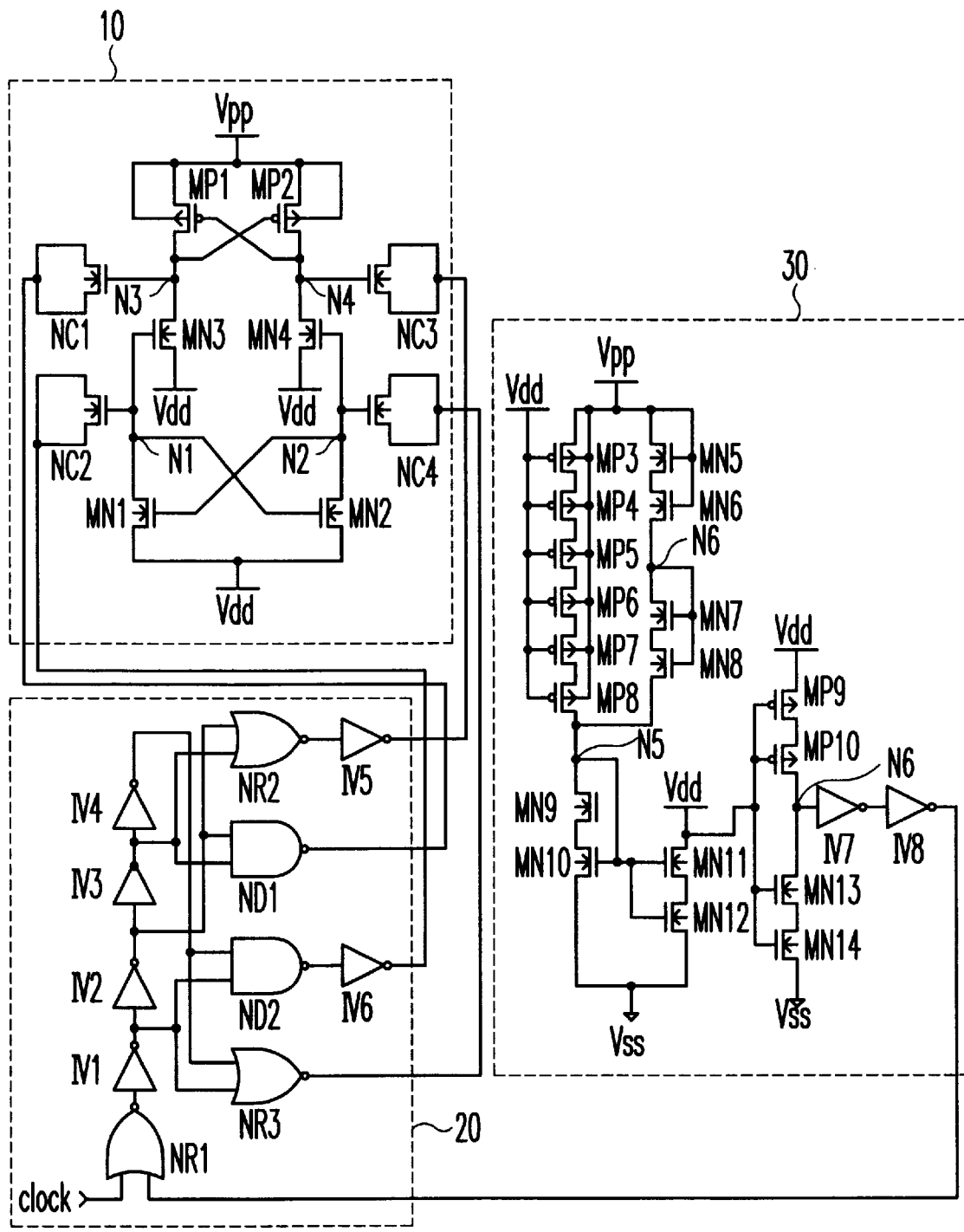
FIG. 3 is a circuit diagram illustrating a high voltage generating circuit in accordance with a preferred embodiment of the present invention.

FIG. 3 is a circuit diagram illustrating a high voltage generating circuit in accordance with a preferred embodiment of the present invention.

The high voltage generating circuit includes:

- a first switch and delay circuit 20 which receives an external clock signal E-Clock and an output signal of a high voltage (Vpp) level sensing portion 30 as an input, stops an electric charge pumping of an high voltage (Vpp) electric charge pumping portion 10 by cutting off a transmission of the external clock signal E-Clock into a high voltage (Vpp) electric charge pumping portion 10 when an electric potential of an output terminal of the high voltage (Vpp) electric charge pumping portion 10 is higher than a reference electric potential of a high voltage (Vpp) reference electric potential sensing portion, and achieves an electric charge pumping operation by transmitting the external clock signal E-Clock into the high voltage (Vpp) electric charge pumping portion 10 when the electric potential of the output terminal of the high voltage (Vpp) electric charge pumping portion 10 is lower than a level of the high voltage (Vpp) level sensing portion 30;
- a high voltage (Vpp) electric charge pumping portion 10 which receives four output signals of the first switch and delay circuit 20, and generates a high voltage Vpp by using an electric charge pumping operation; and
- a high voltage (Vpp) level sensing portion 30 which is connected between an output terminal of the high voltage (Vpp) electric charge pumping portion 10 and an input terminal of the switch and delay circuit 20, stops a transmission of the external clock signal E-Clock into the high voltage (Vpp) electric charge pumping portion 10 by cutting off the first switch and delay circuit 20 when an electric potential of the output terminal of the high voltage (Vpp) electric charge pumping portion 10 is higher than a level of the high voltage (Vpp) level sensing portion 30, and inputs the external clock signal E-Clock into the high voltage (Vpp) electric charge pumping portion 10 by connecting the high voltage (Vpp) electric charge pumping portion 10 to the first switch and delay circuit 20 and thereby performs an electric charge pumping operation of the high voltage (vpp) electric charge pumping portion 10 when the electric potential of the output terminal of the high voltage (Vpp) electric charge pumping portion 10 is lower than a level of the high voltage (Vpp) level sensing portion 30.

The first switch and delay circuit 20 includes:

- a first NOR gate NR1 which combines the external clock signal E-Clock with the output signal of the high voltage (Vpp) level sensing portion 30, and outputs a combined signal to an input terminal of a first inverter IV1;
- a first inverter IV1 which is connected between an output terminal of the first NOR gate NR1 and an input terminal of a second inverter IV2;
- a second inverter IV2 which is connected between an output terminal of the first inverter IV1 and an input terminal of a third inverter IV3;
- a third inverter IV3 which is connected between an output terminal of the second inverter IV2 and an input terminal of a fourth inverter IV4;
- a fourth inverter IV4 which is connected to an output terminal of the third inverter IV3, and is connected between an input terminal of a second NAND gate ND2 and an input terminal of a third NOR gate NR3;
- a second NOR gate NR2 which combines an output signal of the second inverter IV2 with an output signal of the third inverter IV3, and outputs a combined signal to an input terminal of a fifth inverter IV5;
- a fifth inverter IV5 which inverts an output signal of the second NOR gate NR2, and outputs an inverted signal to a third NMOS cap NC3 of the high voltage (Vpp) electric charge pumping portion 10;

a first NAND gate ND1 which combines the output signal of the second inverter IV2 with the output signal of the third inverter IV3, and outputs a combination signal to a first NMOS cap NC1 of the high voltage (Vpp) electric charge pumping portion 10;

a second NAND gate ND2 which combines an output signal of the first inverter IV1 with an output signal of the fourth inverter IV4, and outputs a combined signal to an input terminal of a sixth inverter IV6;

a sixth inverter IV6 which inverts an output signal of the second NAND gate ND2, and outputs an inverted signal to a second NMOS cap NC2 of the high voltage (Vpp) electric charge pumping portion 10; and a third NOR gate NR3 which combines the output signal of the first inverter IV1 with the output signal of the fourth inverter IV4, and outputs a fourth NMOS cap NC4 of the high voltage (Vpp) electric charge pumping portion 10.

The high voltage (Vpp) electric charge pumping portion 10 includes:

a first PMOS transistor MP1 connected between an output terminal of the high voltage Vpp and a third node N3, and of which gate is connected to a fourth node N4;

a second PMOS transistor MP2 connected between an output terminal of the high voltage Vpp and a fourth node N4, and of which gate is connected to a third node N3;

a first NMOS cap NC1 which is connected between the third node N3 and an output terminal of the first NAND gate ND1 of the first switch and delay circuit 20;

a third NMOS cap NC3 which is connected between the fourth node N4 and an output terminal of the fifth inverter IV5 of the first switch and delay circuit 20;

a third NMOS transistor MN3 connected between the third node N3 and a power-supply voltage Vdd, and of which gate is connected to a first node N1;

a fourth NMOS MN4 transistor connected between the fourth node N4 and the power-supply voltage Vdd, and of which gate is connected to a second node N2;

a second NMOS cap NC2 which is connected between the first node N1 and an output terminal of the sixth inverter IV6 of the first switch and delay circuit 20;

a fourth NMOS cap NC4 which is connected between the second node N2 and an output terminal of the third NOR gate NR3 of the switch and delay circuit 20;

a first NMOS transistor MN1 connected between the first node N1 and the power-supply voltage Vdd, and of which gate is connected to the second node N2; and a second NMOS transistor MN2 connected between the second node N2 and the power-supply voltage Vdd, and of which gate is connected to the first node N1.

The high voltage (Vpp) level sensing portion 30 includes:

third to eighth PMOS transistors MP3, MP4, MP5, MP6, MP7 and MP8 which are in series connected between an input terminal of the high voltage Vpp and a fifth node N5, and of which gates are connected to a power-supply voltage Vdd;

fifth and sixth NMOS transistors MN5 and MN6 which are in series connected to an output terminal of the high voltage Vpp and a sixth node N6, and of which gates are connected to an output terminal of the high voltage Vpp;

seventh and eighth NMOS transistors MN7 and MN8 which are connected between the sixth node N6 and the fifth node N5, and of which gates are connected to the sixth node N6;

ninth and tenth NMOS transistors MN9 and MN10 which are in series connected between the fifth node N5 and a ground voltage Vss, and of which gates are connected to the fifth node N5;

eleventh and twelfth NMOS transistors MN11 and MN12 which are in series connected to a power-supply voltage Vdd and the ground voltage Vss, and of which gates are connected to the fifth node N5;

ninth and tenth PMOS transistors MP9 and MP10 which are in series connected between the power-supply voltage Vdd and the sixth node N6, and of which gates are connected to the power-supply voltage Vdd;

thirteenth and fourteenth NMOS transistors MN13 and MN14 which are in series connected between the sixth node N6 and the ground voltage Vss, and of which gates are connected to the power-supply voltage Vdd; and seventh and eighth inverters IV7 and IV8 which are in series connected between the sixth node N6 and one input terminal of the first NOR gate NR1 of the first switch and delay circuit 20.

In operation, an external clock signal passes through a switch and delay circuit 20, and is then converted into the different four clock signals. The phases and pulse widths of the four clock signals are adjusted to achieve a pumping operation. Two pumps cross-coupled by receiving the four clock signals pump the high voltage Vpp by using opposite phases. While a voltage of a Vpp node is increased by a pumping, the voltage of Vpp node is sensed by the high voltage (Vpp) level sensing portion 30, so the switch S for transmitting or cutting off the input clock signal is to be on or off.

Figure 4:
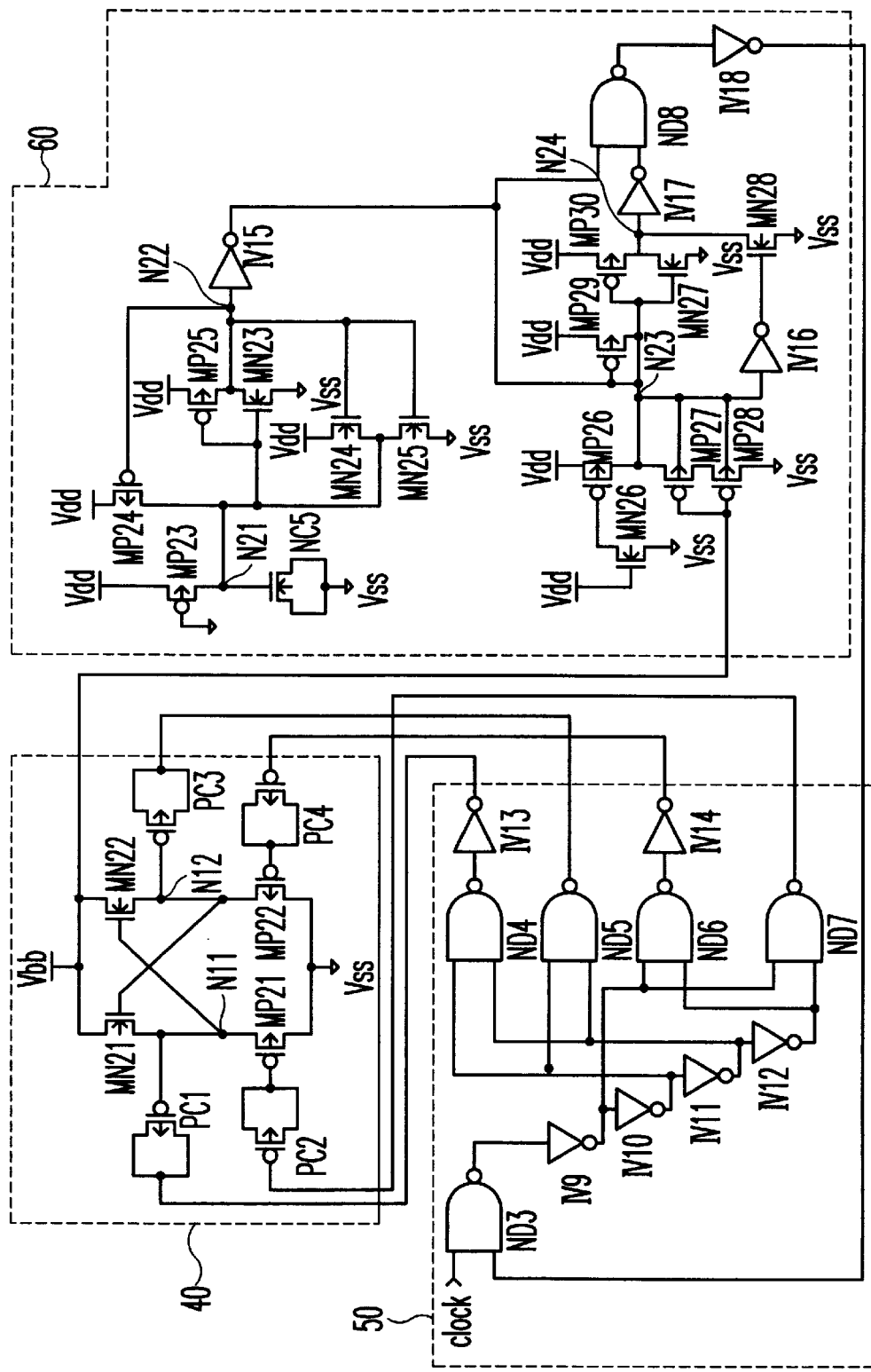
FIG. 4 is a circuit diagram illustrating a bulk bias voltage generating circuit in accordance with a preferred embodiment of the present invention.

FIG. 4 is a circuit diagram illustrating a bulk bias voltage generating circuit in accordance with a preferred embodiment of the present invention.

The bulk bias voltage generating circuit includes:

a second switch and delay circuit 50 which receives an external clock signal E-Clock and an output signal of a bulk bias voltage (Vbb) level sensing portion 60, achieves an electric charge pumping operation by transmitting the external clock signal E-Clock into the bulk bias voltage (Vbb) electric charge pumping portion 40 when an electric potential of the output terminal of the bulk bias voltage (Vbb) electric charge pumping portion 40 is higher than a reference electric potential of a bulk bias voltage (Vbb) reference electric potential sensing portion, and stops an electric charge pumping operation of the bulk bias voltage (Vbb) electric charge pumping portion 40 by cutting off a transmission of the external clock signal E-Clock into the bulk bias voltage (Vbb) electric charge pumping portion 40 when the electric potential of the output terminal of the bulk bias voltage (Vbb) electric charge pumping portion 40 is lower than a level of the bulk bias voltage (Vbb) level sensing portion 60;

a bulk bias voltage (Vbb) electric charge pumping portion 40 which receives four output signals of the second switch and delay circuit 50, and generates a bulk bias voltage Vbb through an electric charge pumping operation; and a bulk bias voltage (Vbb) level sensing portion 60 which is connected between an output terminal of the bulk bias voltage (Vbb) electric charge pumping portion 40 and an input terminal of the second switch and delay circuit 50, transmits the external clock signal E-Clock to the bulk bias voltage (Vbb) electric charge pumping portion 40 by connecting the bulk bias voltage (Vbb) electric charge pumping portion 40 to the second switch and delay circuit 50 when an electric potential of the output terminal of the bulk bias voltage (Vbb) electric charge pumping portion 40 is higher than a level of the bulk bias voltage (Vbb) level sensing portion 60, and cuts off the second switch and delay circuit 50 when the electric potential of the output terminal of the bulk bias voltage (Vbb) electric charge pumping portion 40 is lower than a level of the bulk bias voltage (Vbb) level sensing portion 60, thereby controlling a transmission of the external clock signal-E-Clock Clock into the bulk bias voltage (Vbb) electric charge pumping portion 40.

The second switch and delay circuit 50 includes:

a third NAND gate ND3 which combines the external clock signal E-Clock with the output signal of the bulk bias voltage (Vbb) level sensing portion 60, and outputs a combined signal to an input terminal of a ninth inverter IV9;

a ninth inverter IV9 which is connected between an output terminal of the third NAND gate ND3 and input terminals of sixth and seventh NAND gates ND6 and ND7;

a tenth inverter IV10 which is connected between an output terminal of the ninth inverter IV9 and an input terminal of an eleventh inverter IV11, and of which output terminal is connected to input terminals of fourth and fifth NAND gates ND4 and ND5;

an eleventh inverter IV11 which is connected between an output terminal of the tenth inverter IV10 and an input terminal of a twelfth inverter IV12, and of which output terminal is connected to other input terminals of the fourth and fifth NAND gates ND4 and ND5;

a twelfth inverter IV12 which is connected between an output terminal of the eleventh inverter IV11 and other input terminals of the sixth and seventh NAND gates ND6 and ND7;

a fourth NAND gate ND4 of which two input terminals are connected to the output terminal of the tenth inverter IV10 and the output terminal of the eleventh inverter IV11, and of which output terminal is connected to an input terminal of a thirteenth inverter IV13;

a thirteenth inverter IV13 which is connected between the output terminal of the fourth NAND gate ND4 and a first PMOS cap PC1 of the bulk bias voltage (Vbb) electric charge pumping portion 40;

a fifth NAND gate ND5 of which two input terminals are connected to the output terminal of the tenth inverter IV10 and the output terminal of the eleventh inverter IV11, and of which output terminal is connected to a third PMOS cap PC3 of the bulk bias voltage (Vbb) electric charge pumping portion 40;

a sixth NAND gate ND6 of which two input terminals are connected to the output terminal of the ninth inverter IV9 and an output terminal of the twelfth inverter IV12, and of which output terminal is connected to an input terminal of a fourteenth inverter IV14;

a fourteenth inverter IV14 which is connected between an output terminal of the sixth NAND gate ND6 and a fourth PMOS cap PC4 of the bulk bias voltage (Vbb) electric charge pumping portion 40; and a seventh NAND gate ND7 of which two input terminals are connected to the output terminal of the ninth inverter IV9 and the output terminal of the twelfth inverter IV12, and of which output terminal is connected to a second PMOS cap PC2 of the bulk bias voltage (Vbb) electric charge pumping portion 40.

The bulk bias voltage (Vbb) electric charge pumping portion 40 includes:

a 21th NMOS transistor MN21 connected between an output terminal of the bulk bias voltage (Vbb) and an eleventh node N11, and of which gate is connected to a twelfth node N12;

a 22th NMOS transistor MN22 connected between the output terminal of the bulk bias voltage (Vbb) and a twelfth node N12, and of which gate is connected to the eleventh node N11;

a first PMOS cap PC1 which is connected between the eleventh node N11 and the thirteenth inverter IV13 of the second switch and delay circuit 50;

a third PMOS cap PC3 which is connected between the twelfth node N12 and the fifth NAND gate ND5 of the second switch and delay circuit 50;

a 21th PMOS transistor MN21 connected between the eleventh node N11 and a ground voltage Vss, and of which gate is connected to a second PMOS cap PC2;

a second PMOS cap PC2 which is connected between the gate of the 21th PMOS transistor MP21 and an output terminal of the seventh NAND gate ND7 of the second switch and delay circuit 50;

a 22th PMOS transistor MP22 connected between the twelfth node N12 and the ground voltage Vss, and of which gate is connected to a fourth PMOS cap PC4; and a fourth PMOS cap PC4 which is connected between the 22th PMOS transistor MP22 and an output terminal of the fourteenth inverter IV14 of the second switch and delay circuit 50.

The bulk bias voltage (Vbb) level sensing portion 60 includes:

a 23th PMOS transistor MP23 which is connected between the power-supply voltage Vdd and a 21th node N21, and of which gate is connected to a ground voltage Vss;

a fifth NMOS cap NC5 which is connected between the 21th node N21 and the ground voltage Vss;

a 24th PMOS transistor MP24 which is connected between the power-supply voltage Vdd and the 21th node N21, and of which gate is connected to a 22th node N22;

a 25th PMOS transistor MP25 which is connected between the power supply voltage Vdd and the 22th node N22, and of which gate is connected to the 21th node N21;

a 23th NMOS transistor MN23 which is connected between the 22th node N22 and the ground voltage Vss, and of which gate is connected to the 21th node N21;

a 24th NMOS transistor MN24 which is connected between the power-supply voltage Vdd and the 21th node N21, and of which gate is connected to the 23th node N23;

a 25th NMOS transistor MN25 which is connected between the 21th node N21 and the ground voltage Vss, and of which gate is connected to the 22th node N22;

a fifteenth inverter IV15 which is connected between the 22th node N22 and the 23th node N23;

a 26th NMOS transistor MN26 which is connected between a gate of a 26th PMOS transistor MP26 and the ground voltage Vss, and of which gate is connected to the power-supply voltage Vdd;

a 26th PMOS transistor MP26 which is connected between the power-supply voltage Vdd and the 23th node N23, and of which gate is connected to a drain of the 26th NMOS transistor MN26;

a 27th PMOS transistor MP27 which is connected between the 23th node N23 and a source of a 28th PMOS transistor MP28, and of which gate is connected to a bulk bias voltage (Vbb) output terminal of the bulk bias voltage (Vbb) electric charge pumping portion 40;

a 28th PMOS transistor MP28 which is connected between a drain of the 27th PMOS transistor MP27 and the ground voltage Vss, and of which gate is connected to the bulk bias voltage (Vbb) output terminal of the bulk bias voltage (Vbb) electric charge pumping portion 40;

a 29th PMOS transistor MP29 which is connected between the power-supply voltage Vdd and the 23th node N23, and of which gate is connected to the 23th node N23;

a 30th PMOS transistor MP30 which is connected between the power-supply voltage Vdd and a 24th node N24, and of which gate is connected to the 23th node N23;

a 27th NMOS transistor MN27 which is connected between the 24th node N24 and the ground voltage Vss, and of which gate is connected to the 23th node N23;

a sixteenth inverter IV16 which is connected between the 23th node N23 and a gate of a 28th NMOS transistor MN28;

a 28th NMOS transistor MN28 which is connected between the 24th node N24 and the ground voltage Vss, and of which gate is connected to an output terminal of the sixteenth inverter IV16;

a seventeenth inverter IV17 which is connected between the 24th node N24 and an input terminal of an eighth NAND gate ND8;

an eighth NAND gate ND8 of which two input terminals are connected between the 23th node N23 and an output terminal of the seventeenth inverter IV17, and of which output terminal is connected to an input terminal of an eighteenth inverter IV18; and an eighteenth inverter IV18 which is connected between an output terminal of the eighth NAND gate ND8 and other input terminal of the third NAND gate ND3 of the second switch and delay circuit 50.

The aforementioned bulk bias voltage (Vbb) generating circuit will be operated as follows.

The external clock signal passes through a switch and delay circuit, and is then converted into the different four clock signals. The phases and pulse widths of the four clock signals are adjusted to achieve a pumping operation. Two pumps cross-coupled by receiving the four clock signals pump the bulk bias voltage Vbb by using opposite phases. While a voltage of a Vbb node is lowered by a pumping, the voltage of the Vbb node is sensed by the bulk bias voltage (Vbb) level sensing portion 60, so the switch for transmitting or cutting off the input clock signal is to be on or off.

Figure 5:
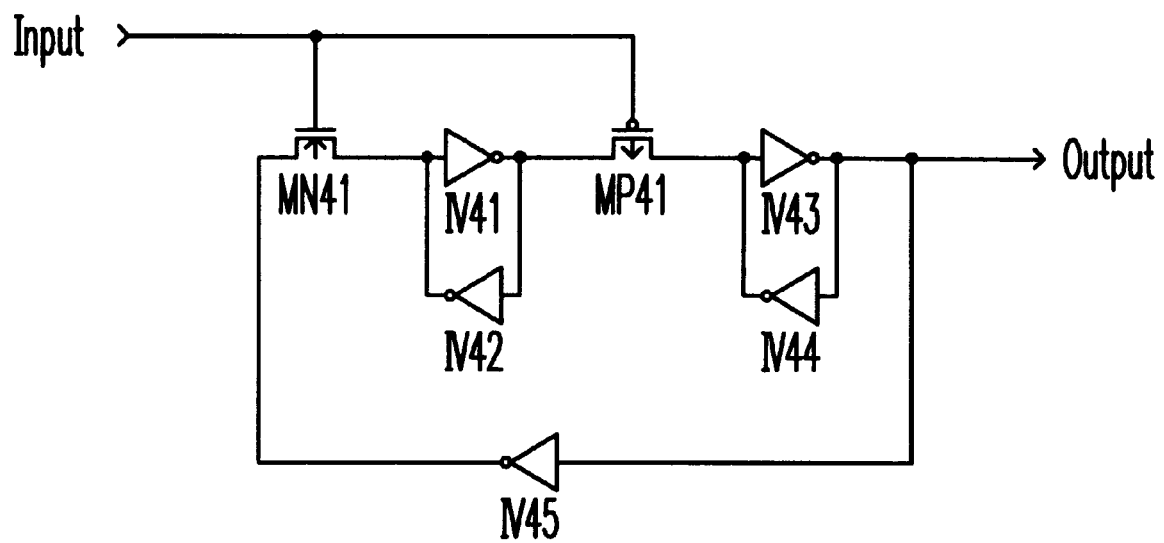
FIG. 5 is a circuit diagram illustrating an external clock frequency dividing circuit in accordance with a preferred embodiment of the present invention.

FIG. 5 is a circuit diagram illustrating an external clock frequency dividing circuit in accordance with a preferred embodiment of the present invention.

The frequency dividing circuit shown in FIG. 5 includes:

a 41th NMOS transistor MN41 which is connected between an input terminal of a 41th inverter IV41 and an output terminal of the 45th inverter IV45, and of which gate is connected to an input terminal of the external clock signal E-Clock;

a 41th inverter IV41 which is connected between a drain of the 41th NMOS transistor MN41 and a drain of a 41th PMOS transistor a 42th inverter IV42 of which input terminal is connected to an output terminal of the 41th inverter IV41, and of which output terminal is connected to an input terminal of the 41th inverter IV41;

a 41th PMOS transistor MP41 of which gate is connected to an output terminal of the external clock signal E-Clock, of which drain is connected to the output terminal of the 41th inverter IV41, and of which source is connected to an input terminal of a 43th inverter IV43;

a 43th inverter IV43 which is connected between the source of the 41th PMOS transistor MP41 and an output terminal of the frequency dividing circuit;

a 44th inverter IV44 of which input terminal is connected to an output terminal of the 43th inverter IV43, and of which output terminal is connected to an input terminal of the 43th inverter IV43; and a 45th inverter IV45 of which input terminal is connected to the output terminal of the frequency dividing circuit, and of which output terminal is connected to the source of the 41th NMOS transistor MN41.

Figure 7:
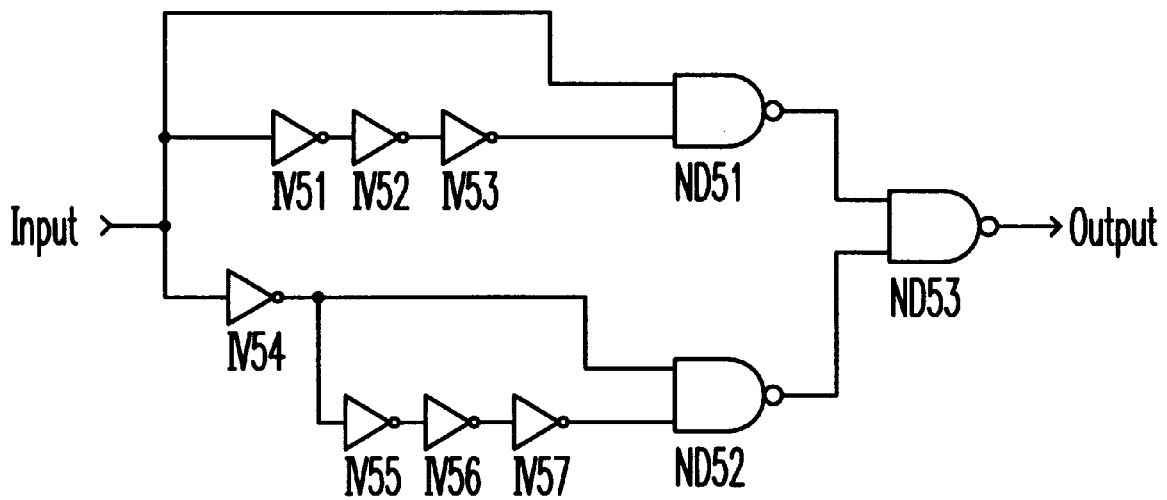
FIG. 7 is a circuit diagram illustrating an external clock frequency doubling portion in accordance with a preferred embodiment of the present invention.
Figure 8A:
FIGS. 8A and 8B show the output waveforms of the external clock frequency doubling portion shown in FIG. 7 in accordance with a preferred embodiment of the present invention.
Figure 8B:

FIG. 7 is a circuit diagram illustrating an external clock frequency doubling circuit in accordance with a preferred embodiment of the present invention. As shown in FIG. 7, the frequency doubling circuit includes:

51th to 53 inverters IV51, IV52 and IV53 which are in series connected between an input terminal of the frequency doubling circuit and an input terminal of a 51th NAND gate ND51;

a 51th NAND gate ND51 of which two input terminals are each connected to the input terminal of the frequency doubling circuit and an output terminal of the 53th inverter IV53, and of which output terminal is connected to an input terminal of a 53th NAND gate ND53;

a 54th inverter IV54 which is connected between the input terminal of the frequency doubling circuit and an input terminal of a 52th NAND gate ND52;

55th ro 57th inverters IV55, IV56 and IV57 which are in series connected between an output terminal of the 54th inverter IV54 and other input terminal of the 52th NAND gate ND52;

a 52th NAND gate ND52 of which two input terminals are connected between the output terminal of the 54th inverter IV54 and an output terminal of a 57th inverter IV57, and of which output terminal is connected to other input terminal of the 53th NAND gate ND53; and a 53th NAND gate ND53 of which two input terminals are connected to an output terminal of the 51th NAND gate ND51 and an output terminal of the 52th NAND gate ND52, and of which output terminal is connected to an output terminal of the frequency doubling circuit.

The frequency dividing circuit and the frequency doubling circuit will now be described with reference to FIGS. 6A, 6B, 6C, 8A and 8B.

Figure 6A:
FIGS. 6A to 6C show the output waveforms of the external clock frequency dividing circuit shown in FIG. 5 in accordance with a preferred embodiment of the present invention.
Figure 6B:
Figure 6C:

When a clock speed is too fast or too slow and a pumping operation is not normally performed, the frequency dividing circuit and the frequency doubling circuit vary the period of the clock applied to the voltage generating apparatus, and then the varied clock signals are input to the voltage generating circuit. The frequency dividing circuit shown in FIG. 5 divides the frequency into halves as shown in FIGS. 6A and 6B. Accordingly, one clock corresponding to the number n of clocks can be generated by using one frequency dividing circuit or more frequency dividing circuits. The frequency doubling shown in FIG. 7 doubles the frequency as shown in FIG. 8E. Accordingly, a plurality of clocks are generated from one clock by using one frequency doubling circuit or more frequency doubling circuits.

As described above, when the voltage generating apparatus according to the present invention is used in a semiconductor memory element, the present invention reduces a chip area and a power-consumption, and generates a voltage with an optimum speed.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art which this invention pertains.

What is claimed is:

1. A voltage generating apparatus, comprising:
   a) clock signal input means for receiving an external clock signal having an external clock frequency, and for providing a modulated clock signal having a modulated clock signal frequency, by dividing or doubling the external clock frequency to form the modulated clock signal frequency;
   b) high voltage electric charge pumping means for generating an electric potential higher than that of an operation power-supply applied from outside, said high voltage electric charge pumping means including:
      1) means for receiving first, second, third and fourth clock signals whose frequencies are the same but whose high level intervals are different from each other; and
      2) means for pumping an electric charge from a power-supply voltage terminal to a high voltage terminal;
   c) high voltage level sensing means including:
      1) means for sensing an output voltage of said high voltage electric charge pumping means,
      2) means for generating a first signal when said output voltage is higher than a predetermined voltage, and
      3) means for generating a second signal when said output voltage is lower than said predetermined voltage; and
   d) switching means for (1) blocking the modulated clock signal from reaching said high voltage electric charge pumping means when an output signal of said high voltage level sensing means is said first signal, and (2) passing the modulated clock signal to said high voltage electric charge pumping means when said output signal of said high voltage level sensing means is said second signal.

2. The voltage generating apparatus as set forth in claim 1, wherein said switching means includes:
   1) first logic gate means which combines said modulated clock signal with said output signal of said high voltage level sensing means, and outputs a combined signal to an input terminal of delay means;
   2) the delay means, which includes first, second, third and fourth inverters which are connected in series in order to delay said combined signal;
   3) second logic gate means which combines an output signal of said second inverter with an output signal of said third inverter, and generates said first clock signal;
   4) third logic gate means which combines said output signal of said second inverter with said output signal of said third inverter, and generates said second clock signal;
   5) fourth logic gate means which combines an output signal of said first inverter with an output signal of said fourth inverter, and generates said third clock signal; and
   6) fifth logic gate means which combines said output signal of said first inverter with said output signal of said fourth inverter, and generates said fourth clock signal.

* * * * *